May 9, 1967 G. J. BATTAGLIA ET AL 3,318,220
PHOTOMECHANICAL APPARATUS
Filed Sept. 11, 1964 5 Sheets-Sheet 1
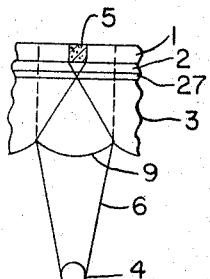
FIG.1A
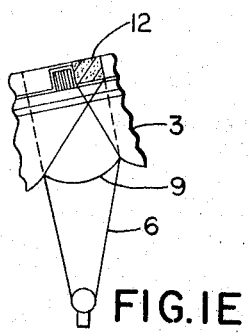
FIG.1E
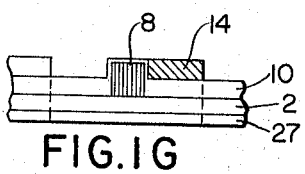
FIG.1I
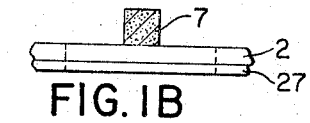
FIG.1B
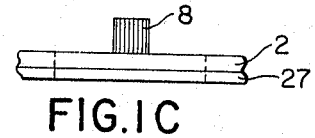
FIG.1C
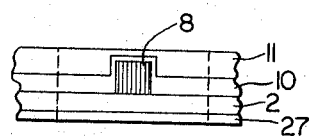
FIG.1D
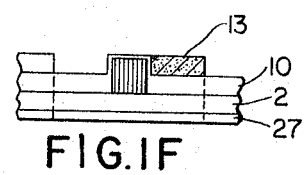
FIG.1F
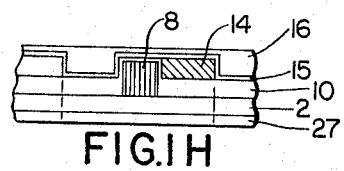
FIG.1G
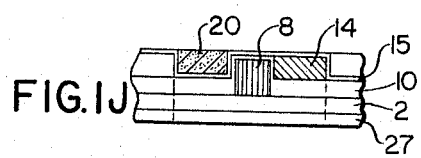
FIG.1H
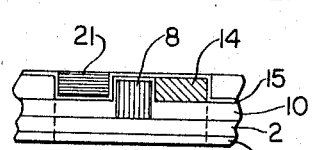
FIG.1J
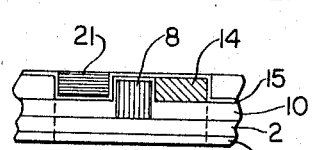
FIG.1K
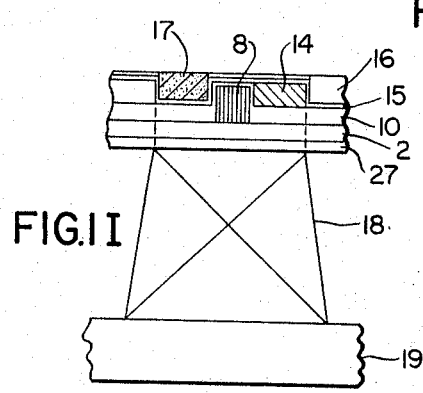
INVENTORS
Glenn J. Battaglia
and
BY Gregory C. Lindin
Brown and Mikulka
ATTORNEYS

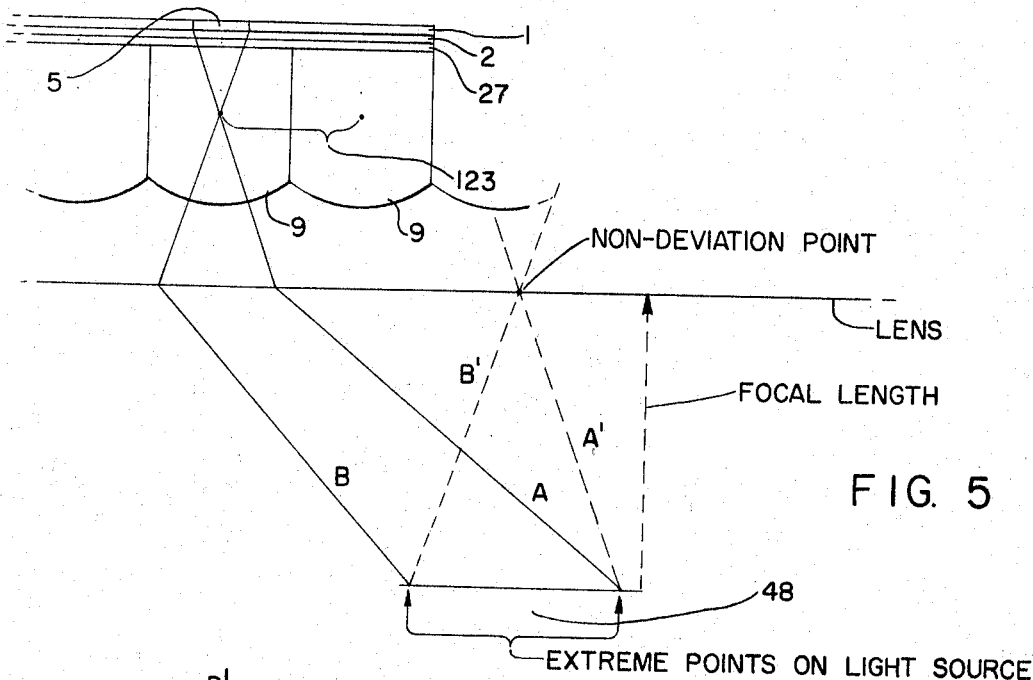
FIG. 5
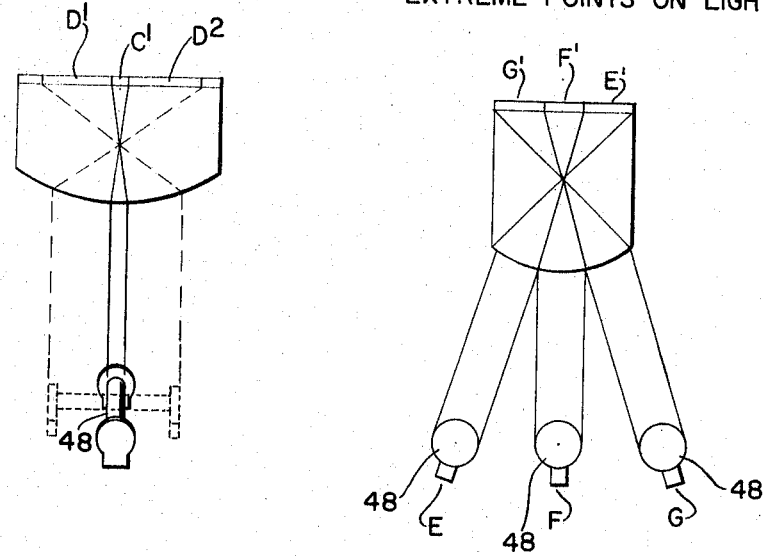
FIG. 6
FIG. 7

May 9, 1967 G. J. BATTAGLIA ETAL 3,318,220
PHOTOMECHANICAL APPARATUS
Filed Sept. 11, 1964 5 Sheets-Sheet 5

INVENTORS
Glenn J. Battaglia
BY and
Gregory E. Lindin
Brown and Mikulka
ATTORNEYS

United States Patent Office 3,318,220
Patented May 9, 1967

3,318,220
PHOTOMECHANICAL APPARATUS
Glenn J. Battaglia, Kanpur, Uttar Pradesh, India, and Gregory E. Lindin, Newton Highlands, Mass., assignors to Polaroid Corporation, Cambridge, Mass., a corporation of Delaware
Filed Sept. 11, 1964, Ser. No. 395,783
5 Claims. (Cl. 95—75)

The present invention is concerned with photomechanical printing apparatus and, more particularly, with photomechanical printing apparatus for making photographic additive color screen elements.

The copending application of Edwin H. Land, Ser. No. 276,785, filed Apr. 30, 1963, discloses processes for preparing additive color screen elements wherein a plurality of photoresponsive layers are applied over one another on the flat side of a lenticular film and small (e.g., about 0.6 mil in width), non-overlapping areas of each layer after their application and before the application of the next layer are exposed and then developed and dyed to provide an additive color screen.

One object of the present invention is to provide apparatus particularly adapted for carrying out the processes set forth in said copending application Ser. No. 276,785.

Another object is to provide apparatus for carrying out such processes which comprises means for varying the size of the exposed areas of the photoresponsive layers.

Still another object is to provide apparatus for carrying out such processes which includes means for exposing only selected, predetermined areas of the photoresponsive layers.

Other objects of the invenion will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following description taken in connection with the accompanying drawings wherein:

FIGURES 1A through 1K are diagrammatic cross-sectional views illustrating stages in a photomechanical printing process;

FIG. 5 is a diagrammatic view illustrating the optics of a Fresnel lens;

FIG. 6 is a diagrammatic view illustrating the optical system for varying the size of the exposed area;

FIG. 7 is a diagrammatic view illustrating the optical system for changing the portion of the photoresponsive layer which is exposed;

Figure 2:
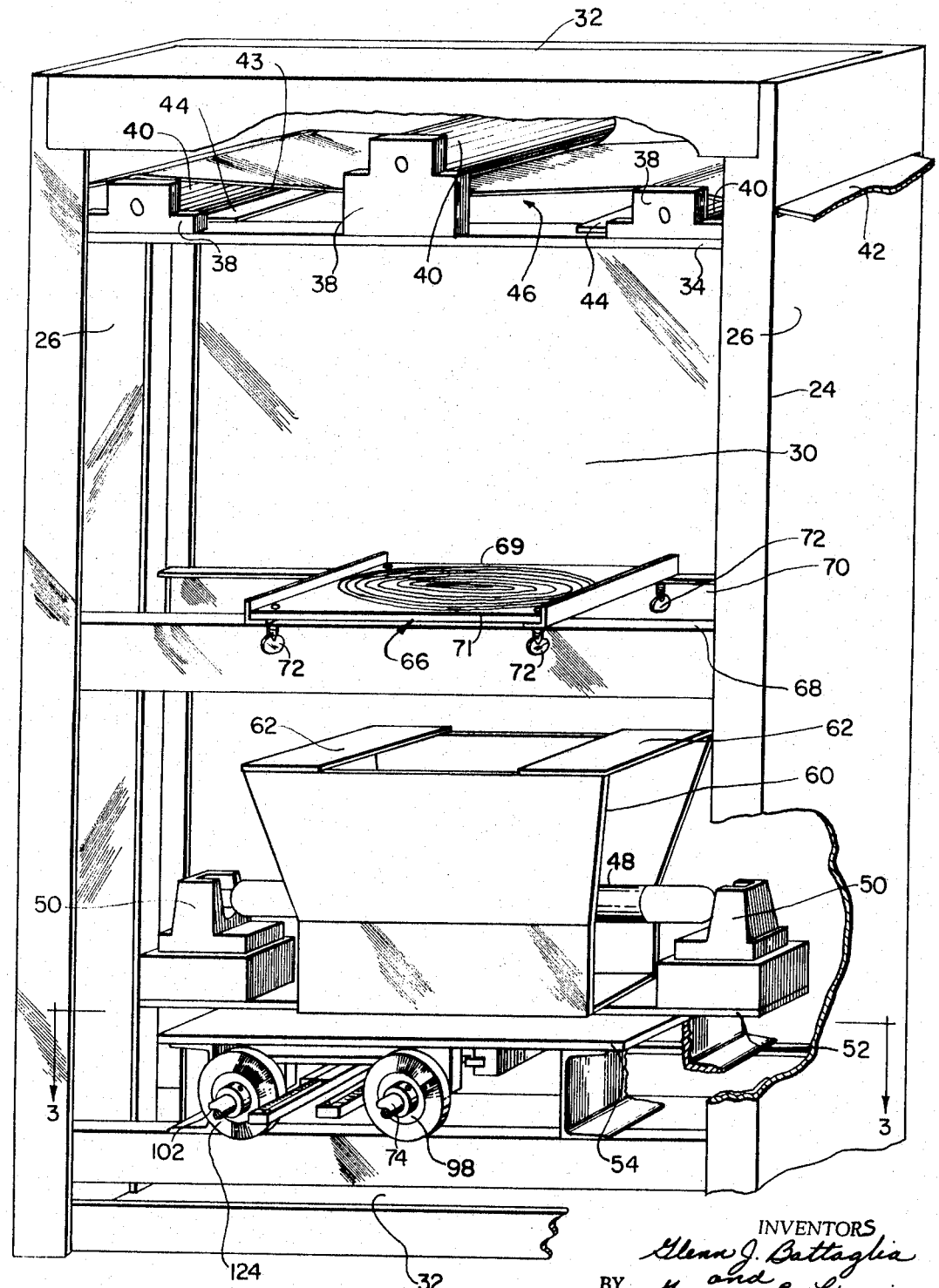
FIG. 2 is a front view of an apparatus embodying the present invention shown with portions of the housing removed.

The processes disclosed in the above-mentioned copending application may best be illustrated by referring to FIGS. 1A to 1K of the present application which are a diagrammatic cross-sectional view illustrating the various stages in one embodiment of such processes. In FIG. 1A there is shown a web comprising a support 27, a lenticular film 3, an adhesive layer 2 and a photoresponsive layer 1, such as a potassium, sodium or ammonium dichromate sensitized gelatin layer. From a source of radiation 4, which is preferably ultraviolet, rays of radiation 6 are directed through each lenticule 9 and expose a portion 5 of the photoresponsive layer 1. For the production of trichromatic color screens, the exposure area 5 usually comprises approximately one-third of the photoresponsive layer contiguous to each lenticule 9. When desired as is well understood in the art, such exposure areas 5 may be increased or decreased depending on factors such as the intensity of the dyes, etc.

Subsequent to photoexposure, in FIG. 1B, the web is contacted with water or other suitable solvent to effect removal of unexposed portions of photoresponsive layer 1, in accordance with the selected exposure pattern, and to provide thereby formation of a resist comprising exposed areas 7.

In FIG. 1C, the web, now comprising exposed areas 7, is contacted with a dye solution, comprising a dye substantive to the resist 7, e.g., a primary red color acid dye, to provide first formed optical filter elements 8.

In FIG. 1D, the web is coated with a second adhesive lacquer layer 10. Subsequent to drying, a second photoresponsive layer 11 is then overcoated on adhesive layer 10.

In FIG. 1E, the web is exposed to radiation 6 from exposure source 4 at such an angle as to provide a second exposure area 12 in photoresponsive layer 11. Area 12 is preferably equal to approximately one-third of the surface area of the respective lenticule 9 immediately adjacent photoresponsive layer 11 and, as a result thereof, provides an exposure area 12 approximately equal, in extent, to that of preceding optical filter element 8.

Subsequent to photoexposure, in FIG. 1F, the web is contacted with a solvent, as previously described, to effect removal of unexposed photoresponsive layer 11, in accordance with the selective exposure pattern, and provide resist 13.

The web in FIG. 1G is contacted with a dye solution containing a dye substantive to resist 13, e.g., an acid dye of green coloration, to provide second optical filter elements 14.

In FIG. 1H, the web, now containing a first and second series of optical filter elements, is coated with a third adhesive lacquer layer 15 which, subsequent to substantial drying, is overcoated with a third photoresponsive layer 16.

The web is then exposed, in FIG. 1I, to diffuse radiation 18, derived from exposure source 19, so as to effect exposure of that area 17 of photoresponsive layer 16 which is not masked by first and second optical filter elements 8 and 14, respectively.

Subsequent to photoexposure the web is contacted with water in FIG. 1J, as previously described, to effect removal of unexposed photoresponsive layer 16, in accordance with the exposure pattern, and provide resist 20.

In FIG. 1K, the web is contacted with a dye solution containing a dye substantive to resist 20, e.g., an acid dye of blue coloration, to provide third optical filter elements 21.

In general, the apparatus of the present invention comprises a housing, means for advancing a sheet of lenticular film bearing a layer of photoresponsive material through said housing, a light source preferably an elongated or line source of light projecting light onto said film, means for causing the rays of light impinging on each lenticule from any one point on the light source to be substantially parallel to one another, and means for varying the angle at which the light rays from said light source impinge upon said lenticules whereby selected predetermined areas of the photoresponsive layer may be exposed and means for varying the size of the predetermined exposed areas. In preferred embodiments of the present invention, the means for varying the angle at which the light rays impinge upon said lenticules and the means for varying the size of the predetermined exposed area are associated with the light source; the former preferably comprises means for changing the relative transverse position of said light with respect to the direction of sheet transport and the latter preferably comprises means for varying the dimensions, transverse to the direction of sheet transport, of the light source.

Figure 3:
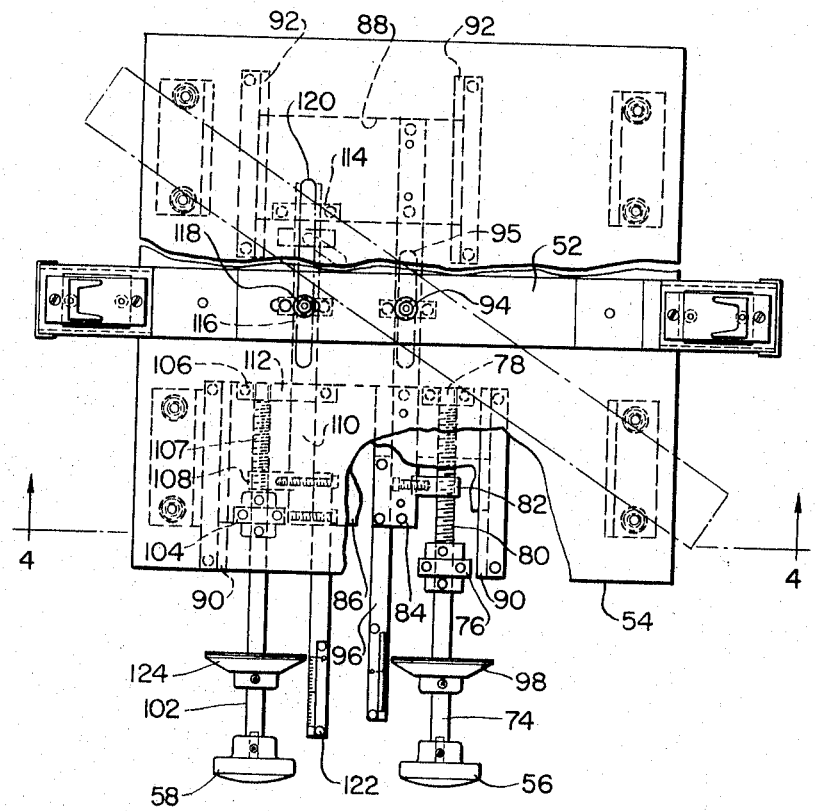
FIG. 3 is a fragmentary plan view taken substantially along the line 3—3 of FIG. 2.
Figure 4:
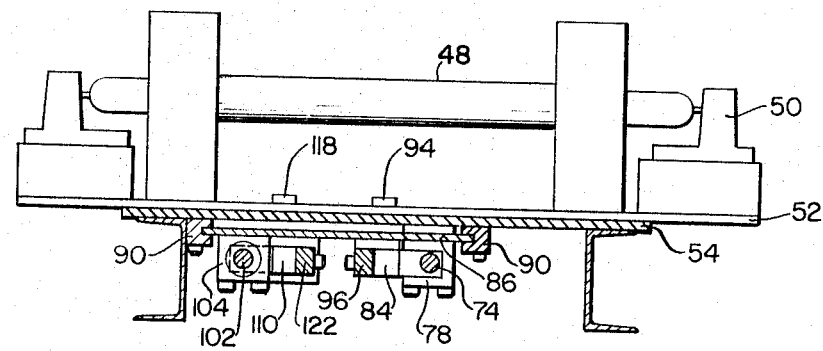
FIG. 4 is a sectional view of the light source and the transverse and angular control mechanism taken substantially along the line 4—4 of FIG. 3.

Reference is now made to FIGS. 2, 3 and 4 wherein there is shown apparatus comprising a housing 24, having side walls 26, a back wall 30, a front wall (removed) and end walls 32. In the upper portion of the housing 24 there are provided front and rear roller-mounting brackets 34 which run between the side walls 26 and are attached thereto. Roller-mounting brackets 34 support roller mounts 38 which, in turn, hold rollers 40 which serve as means for advancing an elongated sheet of lenticular film 42 through the housing 24. Generally, the lenticular film 42 comprises a plurality of elongated contiguous, parallel rows of minute cylindrical lenticules 9 (FIG. 5), e.g., about 1.8 mils in width. The elongated rows are preferably arranged on the film 42 in such a manner that longitudinal axes 123 (FIG. 5) of the cylindrical lenticules are substantially parallel to the elongated edge 43 of the sheet and substantially parallel to the direction of sheet transport 42 through the apparatus. The roller-mounting brackets 34 further support first aperture plates 44 which extend from the back roller-mounting bracket 34 (not shown) to the front roller-mounting bracket 34 and which are longitudianlly movable along said brackets so as to be able to variably define the exposure stage 46 and thus regulate the time of exposure and consequently the amount of radiant energy received by the lenticular surface.

In the bottom of the housing 24 there is provided an elongated light source, i.e., a light having substantial length and relatively narrow width, usually of the ultraviolet type, which is mounted through connectors 50 to a light plate 52. Light plate 52 rests on a supporting table 54 upon which it (the light plate 52) may be moved (a) transversely to the direction of sheet transport 42 through the apparatus by rotation of transverse control knob 56 (FIG. 3) and (b) rotated horizontally, i.e., in a plane parallel to the planar surface of said sheet 2, about a point intermediate its ends, preferably its mid-point, by rotation of an angular control knob 58 (FIG. 3). The light source 48 is shielded by protector plate 60 enclosing the light source. The length of the light source 48 which is used for exposure is defined by a plurality of second aperture plates 62 which are slidably mounted along the upper edges of the protector plate 60.

Means for collimating the light shown as a Fresnel lens 66 are interposed between the light source 48 and the exposure area 46. Lens 66 is held on front 68 and back 70 lens supports which are connected to the side walls 26. The lens 66 is pivotally mounted on the front 68 and back 70 lens supports so that the far side 69 and near side 71 of lens 66 may be elevated. As means for elevating a side of lens 66, there are provided pitch screws 72 mounted in the front 68 and back 70 lens supports. The pivotal mounting of the lens 66 permits the axis of the lens 66 to be deviated relative to the transverse position of the light source 48 so that the axis of the lens 66 may coincide with a ray of light emanating from some point along the length of the light source 48. As will be understood, the feature of being able to change the pitch of the lens 66 relative to the transverse movement of the light source 48 enables one to maintain optical symmetry between the lens 66 and the light source 48 regardless of the transverse position of the light source 48.

Referring now to FIGS. 3 and 4, there is shown a mechanism for moving and rotating the light source. As pointed out above, the transverse movement of the light source is brought about by rotation of transverse control knob 56. The transverse control knob 56 is fixedly attached to a first rotatable shaft 74 which rotates in front 76 and rear blocks 78. The front 76 and rear blocks 78 are fixedly mounted to the underside of the supporting table 54 and permit the rotatable shaft 74 to revolve about its axis without moving transversely. The portion 80 of the rotatable shaft between the front block 76 and the rear block 78 is threaded and carries on it a first nut 82 which is moved transversely along shaft 74 by rotation thereof. The nut 82 is fixedly attached to, and brings about the transverse movement of, a first square shaft 84 which in turn is fixedly attached to a front movable plate 86 and a rear movable plate 88. The front movable plate 86 and the rear movable plate 88 move transversely respectively in front channels 90 and rear channels 92 which are fixedly attached to the underside of the supporting table 54. The first square shaft 84 is connected to the light plate 52 and brings about the transverse movement of said plate 52 by bolt 94 which runs through a first transverse channel 95 in the supporting table 54. The first square shaft 84 is further joined to and causes the transverse movement of a transverse indicator shaft 96 which coacts with a transverse indicator dial 98, which is fixedly mounted on the rotatable shaft 74, to indicate the transverse position of the light source 48 relative to the direction of sheet transport.

The angular rotation of the light source 48 in a plane parallel to the planar surface of the sheet 42 is controlled by the angular control knob 58 shown on the left side of the apparatus. Angular control knob 58 is fixedly attached to a second rotatable shaft 102 which rotates in second front 104 and second rear blocks 106. The second front 104 and rear blocks 106 are attached to the underside of the front movable plate 86 and permit the second rotatable shaft 102 to revolve about its longitudinal axis without moving transversely. The portion 107 of second rotatable shaft 102 between the second front 104 and rear blocks 106 is threaded and carries a second nut 108 which moves transversely along the threads when the second rotatable shaft 102 is rotated. The second nut 108 is fixedly attached to and causes transverse movement of a second square shaft 110 which is slidably movable in front 112 and rear 114 shaft guides which are respectively mounted on the underside of the front 86 and rear 88 movable plates. The second square shaft 110 is connected to an off-center portion 116 of the light plate 52 by a second bolt 118 which runs through a second transverse channel 120 in the supporting table 54. As can be noted, the transverse movement of the second square shaft 110 causes the light plate 52 to rotate around the first bolt 94. The angular position of light source 48 relative to the direction of sheet transport is indicated through the coaction of (a) the angular indicator shaft 122, which is attached to the second square shaft 110, and (b) the angular reference indicator dial 124 which is fixedly attached to the second rotatable shaft 102.

It should be noted in the above mechanisms that when the transverse control knob 56 is rotated the light source and all of the angular control mechanism move transversely. However, when the angular control knob 58 is rotated the light source rotates but the transverse control mechanism remains stationary.

In the embodiment of the present invention illustrated in FIGS. 2, 3 and 4, the light is collimated by Fresnel lens 66. The lens serves to make the light rays impinging on lenticules 9, such as near the longitudinal edges 43, substantially parallel with the rays emanating from the same point on the light source and impinging on lenticules 9 at less extreme points on the sheet. The optics of such a lens may be illustrated by reference to FIG. 5 wherein rays of light A, A$^1$, B and B$^1$ are given off from two points on the light source 48 which is positioned at the focal point of the lens. Rays $A^1$ and $B^1$ pass through the non-deviation point (on the lens axis) of the lens and their path is unaffected. Rays A and B upon emerging from the lens are respectively parallel to rays $A^1$ and $B^1$. Similarly, other rays emanating from the same points and impinging on other lenticules 9 will be substantially parallel to rays $A^1$ and $B^1$ upon emerging from the lens 66. As can be noted, the lens 66 serves to prevent differences in the exposures at extreme points on the sheet 42.

In using the apparatus of the present invention the amount of radiant energy reaching the film is controlled by moving the first aperture plates 44 so as to vary the time of exposure. The amount of radiant energy is increased by opening plates 44 and decreased by closing the plates. When desired, the time of exposure may be further varied by changing the speed at which the sheet 42 is advanced through the apparatus.

As pointed out above, the size of the exposed area may be controlled by the angular rotation of the elongated light source 48. The smallest area will be produced when the elongated light source, lengthwise, lies parallel to the axes of the lenticules, i.e., parallel to the direction of sheet transport 42 through the apparatus, and will be largest when the light source 48 is perpendicular to said axes. This may best be illustrated by referring to FIG. 6 wherein the light source 48 is shown in solid lines when its length is substantially parallel with the direction of transport of sheet 42 and in broken lines when it (48) is rotated in a plane parallel to the plane of the sheet so as to be substantially perpendicular to the direction of sheet transport. In the former position the exposure area comprises $C^1$ whereas in the latter position the exposure area comprises $C^1$ plus $D^1$ and $D^2$.

FIG. 7 illustrates how the transverse movement of the light source changes the angle at which light emanating from the light source 48 impinges on the lenticules 9 and brings about the selective exposure of different portions of the photoresponsive layer. As shown therein when the light source 48 is placed in transverse position E, area $E^1$ is exposed. When the light source 48 is moved to transverse position F, area $F^1$ is exposed and when the light source 48 is moved to transverse position G, area $G^1$ is exposed. After the first two exposures there usually is no need to carefully carry out the third exposure. Thus, the third exposure may be carried out by merely flooding the whole film with light, exposing all the remaining unexposed positions.

In further embodiments of the present invention the angle at which light emanating from the light source impinges on the lenticules may be varied by holding the light source 48 in a fixed position and changing the pitch of the plane of the sheet transversely to the direction of sheet transport.

As set forth above, the transverse and angular positions of the light source 48 relative to the direction of sheet transport 42 through the apparatus are shown respectively on the transverse indicator shaft and dial and the angular indicator shaft and dial. It should be understood that any desirable scale may be put on these shafts for this purpose.

The apparatus of the present invention may be operated by setting the transverse control knob 56 and the angular control knob 58 to the desired positions and advancing the film 42 through the apparatus for exposure. The exposed film 42 is then processed by methods such as set forth above and the transverse 56 and angular 58 control knobs are reset. The film is again run through the apparatus and processed. The procedure may be repeated as many times as desired.

Figure 8C:
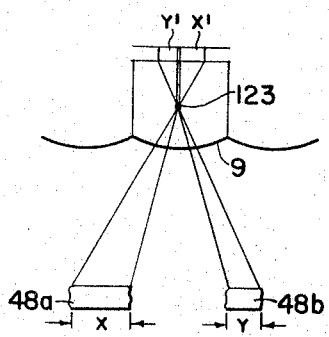
FIG. 8C is a diagrammatic view illustrating the optics of the embodiment of FIGS. 8A and 8B.
Figure 8A:
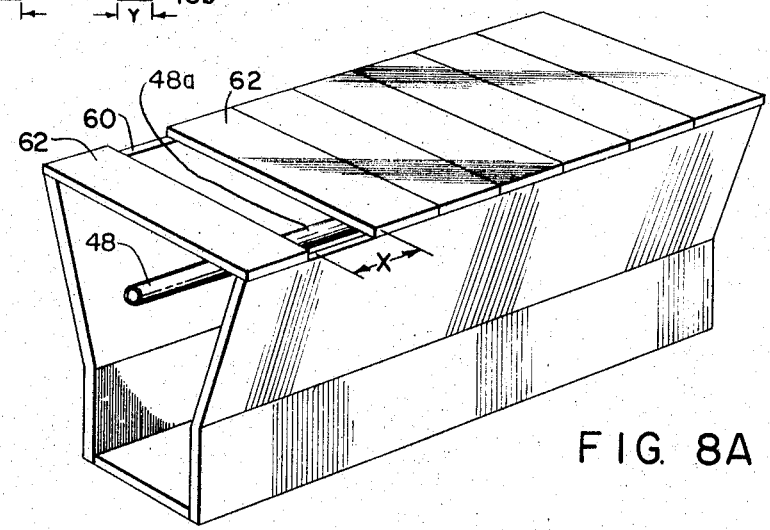
FIGS. 8A and 8B are perspective views showing another embodiment of the present invention.
Figure 8B:
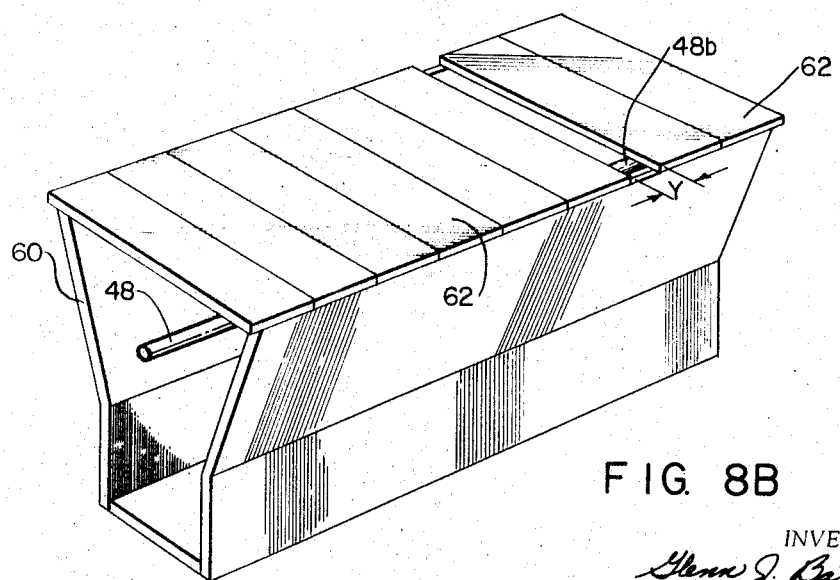

In further embodiments of the apparatus of the present invention, the size of the exposed area, as well as the position of the exposed area, may be varied solely by means of the second aperture plates 62 (FIG. 2). In such embodiments, the second aperture plates 62 are used to selectively define the portion and length of the light source, transverse to the direction of sheet transport, which is to be used for the exposure. In preferred embodiments of this type, the elongated light source 48 is rotated in a horizontal plane (i.e., parallel to the plane of the sheet) so that its length is at an angle and preferably substantially perpendicular to the axes 123 (FIG. 5) of the lenticules 9 of the advancing sheet 42 and the second aperture plates 62 are positioned along the edges of the protector plate 60 so as to limit the (a) length and (b) portion of the elongated light source 48 which is to be used for the exposure. Referring now to FIGS. 8A, 8B and 8C, there is shown such an embodiment wherein the elongated light source 48 is set perpendicular to the axes 123 of the lenticules 9 (not shown in FIGS. 8A and 8B). In FIG. 8A the second aperture plates 62 are positioned over the protector plate 60 so that a first portion 48a of the elongated light source 48, having a length X, is used for the exposure. Subsequent to the exposure and processing, the second aperture plates 62 are again moved so that a second portion 48b (FIG. 8B) of the light source 48, having a length Y, is used for exposure. FIG. 8C diagrammatically illustrates how the movement of the second aperture plates 62 may be used to selectively vary the position and size of the exposed areas. In FIG. 8C, light rays from the first portion 48a and the second portion 48b of the light source 48 impinge upon the lenticule 9 from different angles and, respectively, expose areas $X^1$ and $Y^1$ which are proportional in size to the respective lengths of the first 48a and second 48b portions of the light source 48.

It should be noted that the embodiment described immediately above permits one to use a plurality of elongated light sources 48 and thus provides a ready means for increasing the amount of light available for exposure.

As pointed out above, the collimating means is useful in preventing differences in the exposures produced at extreme portions of the sheet. When desired, such differences may also be eliminated, without the collimating means, by placing the light source at a sufficient distance from the lenticules (e.g., infinity) that the light rays impinging on each lenticule from the same point on the light source will be substantially parallel to one another.

In carrying out the exposures of the present invention, it is preferable to make the first and second exposures near the center portion of the arc of the lenticules where aberrations are less apt to occur and then use a flood exposure for the third.

In a further embodiment of the present invention, a lenticular sheet, i.e., a sheet comprising a plurality of elongated, contiguous, parallel rows of minute cylindrical lenticules 9, is fixedly mounted in the exposure stage 46 so that light from the light source 48 passes through the lenticules and is focused on predetermined portions of the photoresponsive layer, as it passes through the exposure stage 46. As can be noted, this embodiment eliminates the need to coat the photoresponsive layers on the lenticular sheets and any suitable film support may be employed. In such embodiments the lenticular sheet is oriented in the same manner as set forth above, i.e., the cylindrical axes are parallel to the direction of sheet transport. Care should be taken to insure that the sheet carrying the photoresponsive layers is in substantially the same register on each passage through the apparatus.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An apparatus for the selective exposure of a light-sensitive material contiguous a sheet of lenticular film, said apparatus comprising a housing; means for advancing a sheet having elongated rows of lenticules thereon through said housing so that the axes of said lenticules are parallel to the path of said sheet through said housing; an elongated light source in said housing directing light on said sheet; means positioned between said light source and said sheet for variably controlling the amount of radiant energy received by said sheet; means for collimating said light interposed between said light source and said sheet; means for moving said elongated light source in a direction which is transverse to the path of said sheet through said housing; and means for rotating said elongated light source about a point intermediate its ends in a plane which is parallel to the plane of said sheet.

2. An apparatus for the selective exposure of predetermined areas of a photosensitive sheet, said apparatus comprising a housing; an exposure stage in said housing; means for advancing said photosensitive sheet through said exposure stage; an elongated light source in said housing directing rays of light on said exposure stage; a sheet of lenticular film comprising a plurality of elongated, contiguous, parallel rows of minute cylindrical lenticules positioned in said exposure stage so that light from said light source passes through said lenticules and is focused on predetermined areas of said photosensitive sheet, the cylindrical axes of said lenticules being parallel to the direction of transport of said photosensitive sheet through the exposure stage; and means for rotating said elongated light source about a point intermediate the ends of said light source in a plane which is parallel to the plane of said sheet in the exposure stage.

3. An apparatus for the selective exposure of predetermined areas of a photosensitive sheet, said apparatus comprising a housing; an exposure stage in said housing; means for advancing said photosensitive sheet through said exposure stage; an elongated light source in said housing directing rays of light on said exposure stage; a sheet of lenticular film comprising a plurality of elongated, contiguous, parallel rows of minute cylindrical lenticules positioned in said exposure stage so that light from said light source passes through said lenticules and is focused on predetermined areas of said photosensitive sheet, the cylindrical axes of said lenticules being parallel to the direction of transport of said photosensitive sheet through the exposure stage; means for moving said elongated light source in a direction which is transverse to the direction of transport of said photosensitive sheet through said exposure stage; and means for rotating said elongated light source about a point intermediate the ends of said light source in a plane which is parallel to the plane of said sheet in the exposure stage.

4. An apparatus for the selective exposure of a light-sensitive material contiguous a sheet of lenticular film, said apparatus comprising a housing; means for advancing a sheet having elongated rows of lenticules thereon through said housing so that the axes of said lenticules are parallel to the path of said sheet through said housing; an elongated light source in said housing directing light on said sheet; and means for rotating said elongated light source about a point intermediate its ends in a plane which is substantially parallel to the plane of said sheet.

5. Apparatus according to claim 4 which includes means for moving said elongated light source in a direction which is transverse to the path of said sheet through said housing.

References Cited by the Examiner
UNITED STATES PATENTS

| | | | |
|---|---|---|---|
| 1,968,145 | 7/1934 | Heymer | 95—75 |
| 2,025,862 | 12/1935 | Heymer | 88—24 |
| 2,064,058 | 12/1936 | Eggert | 88—24 |
| 2,150,932 | 3/1939 | McDonnell | 95—18 |
| 2,382,604 | 8/1945 | Capstaff | 88—24 |
| 2,492,520 | 12/1949 | Bonnet | 95—18 |
| 2,562,077 | 7/1951 | Winnek | 88—24 |

JOHN M. HORAN, *Primary Examiner.*